(No Model.)
B. E. VAUGHN.
BELL.
No. 439,614. Patented Oct. 28, 1890.
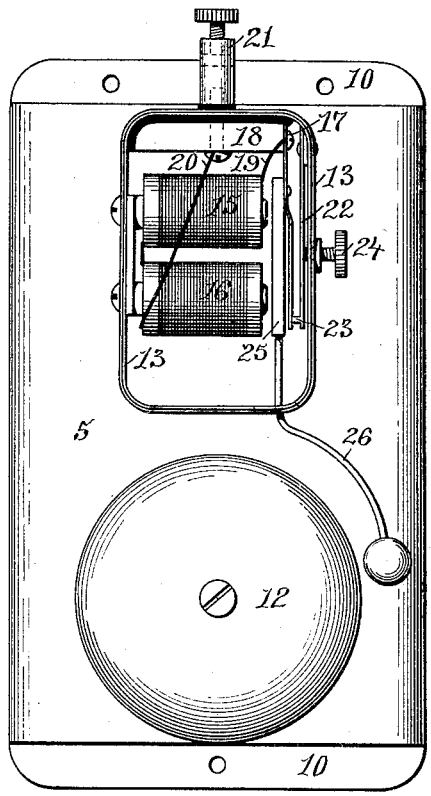
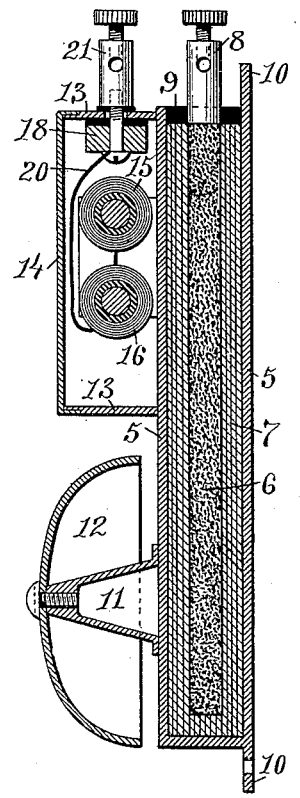
WITNESSES:
Chas. H. Luther Jr.
M. F. Bligh
INVENTOR:
B. Egbert Vaughn
by Joseph A. Miller & Co.
Attys

UNITED STATES PATENT OFFICE.

BENJAMIN EGBERT VAUGHN, OF HILL'S GROVE, RHODE ISLAND, ASSIGNOR OF ONE-HALF TO FRANK L. HARRIS, OF SAME PLACE.

BELL.

SPECIFICATION forming part of Letters Patent No. 439,614, dated October 28, 1890.

Application filed July 23, 1890. Serial No. 359,599. (No model.)

*To all whom it may concern:*

Be it known that I, BENJAMIN EGBERT VAUGHN, of Hill's Grove, in the county of Kent and State of Rhode Island, have invented a new and useful Improvement in Electric Bells; and I hereby declare that the following is a full, clear, and exact description of the same, reference being had to the accompanying drawings, forming part of this specification.

This invention has reference to an improvement in the construction of electrically-actuated bells in which the striking-lever is operated by the attraction of the armature of an electro-magnet; and it consists in the peculiar and novel construction of a dry battery by which the battery forms the base and support for the bell and operating mechanism, as will be more fully set forth hereinafter.

The object of this invention is to secure an electric bell ready to be placed in position by any person and connected with a push-button or other circuit-closing device.

Another object of this invention is to simplify the construction of an electric bell by securing the case containing the electro-magnet directly to the zinc element of the battery.

In placing electric call or alarm bells as heretofore constructed the two poles of the bell-operating magnets were connected with the two poles of a battery and with one or more circuit-closing devices. The connecting of the conductor-wires required such knowledge of circuits as necessitated the employment of one versed in the art. By the peculiar construction of my electric bell any one can connect two conductor-wires to the two binding-posts of the bell and to the two binding-posts of any push-button or circuit-closing device without any particular care or electrical knowledge.

Figure 1 is a front view of my improved electric bell, the cover of the box inclosing the electro-magnet being removed, so as to show the magnet and the striking-arm. Fig. 2 is a sectional view of the electric bell, the operating mechanism, and the battery.

In the drawings, the number 5 indicates a zinc case of practically rectangular cross-section, one end of the case being open. The zinc forming the case 5 also forms one element of the battery.

The number 6 indicates the carbon element of the battery, and 7 the excitant interposed between the inner surface of the case and the carbon 6. The carbon is provided with the binding-post 8, extending through the open end of the case 5, which end is now closed with the insulating material 9, forming a hermetic seal, by which the post 8 is insulated from the zinc case 5. The case 5 has the projections 10 provided with holes for securing the device in any desired position. These projections 10 are shown in the ends of the oblong case 5; but they may be at any other part of the case, or they may be omitted and the case secured in any other desired manner.

The standard 11, on which the bell 12 is supported, is secured to the upper side of the case 5, preferably by solder. The sides 13, inclosing the striker-operating devices, are also secured to the case 5, preferably by solder. The cover 14 may be secured to the sides 13 by solder, or form a sliding air and dust tight cover.

The magnets 15 and 16 are secured to one of the sides 13. The wire on the spools of the magnets is connected by the wire 19 with the spring 17 at the end secured to the insulated non-metallic base 18, and the other end of the spool-wire is connected by the wire 20 with the binding-post 21, secured to the non-metallic base 18 and insulated from the side 13, and thereby from the zinc element of the battery.

The spring 22, secured at one end to the side 13, is provided at the opposite end with the contact-point 23. The regulating-screw 24 is screw-threaded in the side 13 and bears against the spring 22 about midway its length.

The armature 25, forming part of the striking-lever 26, is secured to the spring 17.

The operation of my improved electric bell is as follows: The zinc element of the battery, being in metallic connection with the sides 13, is in the position shown in Fig. 1 in metallic contact through the spring 22 and contact-point 23 with the spring 17, by means of the wire 19 with the wire of the spools of the magnets 15 and 16, and by the wire 20 with the insulated binding-post 21. When now electric connection is made between the post 21 and the post 8, forming the terminal of the carbon element of the battery, the current passes through the spool-wires of the magnets, draws on the armature 25 and the striking-lever against the bell, thereby bending the spring 17 and operating the same from the contact-point 23 so as to break the circuit, demagnetizing the core of the magnet, releasing the armature, and by the resilience of the spring 17 closing the circuit by making contact with the contact-point 23, and so continuing automatically to make and break the circuit and cause the striking-lever to bring the hammer against the bell until the electric connection between the posts 21 and 8 is broken.

The binding-posts may be connected with any circuit-closing device, and any of the well-known automatic make and break devices for operating the bell-hammer may be used.

My improved self-contained electric bell may be secured in any desired position and operated from any desired distance.

Having thus described my invention, I claim as new and desire to secure by Letters Patent—

1. The combination, with the case 5, the carbon 6, and excitant 7, of the post 11, secured to the case 5, the bell 12, the inclosing-sides 13, the magneto-electric hammer-operating device secured to the case 5, and the binding-posts 21 and 8, constructed to form a self-contained electric bell, as described.

2. The combination, with the zinc case 5, the carbon 6, and excitant 7, of the sides 13, secured to the case and inclosing the magnets, the spring 22 in electric contact with the sides and the case 5, the insulated base 18, the spring 17, armature 25, striking-lever 26, bell 12, the magnets 15 and 16, the insulated binding-post 21, and wires connecting the spring 17 through the spools of the magnets with the binding-post 21, and the binding-post 8, forming the terminal for the carbon element, constructed to form a self-contained electric bell, as described.

B. EGBERT VAUGHN.

Witnesses:
J. A. MILLER, Jr.,
M. F. BLIGH.